US012576629B2

(12) United States Patent
You et al.

(10) Patent No.: US 12,576,629 B2
(45) Date of Patent: Mar. 17, 2026

(54) ADHESIVE LAYER FORMING APPARATUS AND DISPLAY DEVICE MANUFACTURING SYSTEM INCLUDING THE SAME

(71) Applicant: STI CO., LTD., Anseong-si (KR)

(72) Inventors: Dae Il You, Cheonan-si (KR); Eun Su Jeon, Anseong-si (KR); Sang Pil Park, Anseong-si (KR); Kyu Yong Han, Anseong-si (KR)

(73) Assignee: STI CO., LTD., Anseong-si (KR)

( * ) Notice: Subject to any disclaimer, the term of this patent is extended or adjusted under 35 U.S.C. 154(b) by 867 days.

(21) Appl. No.: 17/861,935

(22) Filed: Jul. 11, 2022

(65) Prior Publication Data

US 2023/0029555 A1     Feb. 2, 2023

(30) Foreign Application Priority Data

Jul. 28, 2021     (KR) ........................ 10-2021-0099456

(51) Int. Cl.
*B32B 37/12*          (2006.01)
*B32B 38/18*          (2006.01)
*B32B 41/00*          (2006.01)

(52) U.S. Cl.
CPC .............. *B32B 37/12* (2013.01); *B32B 38/18* (2013.01); *B32B 41/00* (2013.01); *B32B 2037/1253* (2013.01); *B32B 2038/1891* (2013.01); *B32B 2309/14* (2013.01); *B32B 2310/0831* (2013.01); *B32B 2457/20* (2013.01)

(58) Field of Classification Search
None
See application file for complete search history.

(56) References Cited

U.S. PATENT DOCUMENTS

| | | | | |
|---|---|---|---|---|
| 8,123,456 B2 * | 2/2012 | Wakabayashi | .... | H01L 21/67775 |
| | | | | 414/940 |
| 2002/0062787 A1 * | 5/2002 | Hashizume | ......... | B32B 38/1841 |
| | | | | 118/671 |
| 2013/0105090 A1 * | 5/2013 | Lee | ......................... | B32B 41/00 |
| | | | | 156/701 |

(Continued)

FOREIGN PATENT DOCUMENTS

| | | | |
|---|---|---|---|
| CN | 109764040 A | * | 5/2019 |
| KR | 10-1848039 | | 4/2018 |

OTHER PUBLICATIONS

CN109764040A_machine_translation (Year: 2019).*

*Primary Examiner* — Michael N Orlando
*Assistant Examiner* — Abhishek A Patwardhan
(74) *Attorney, Agent, or Firm* — KILE PARK REED & HOUTTEMAN PLLC

(57) ABSTRACT

Disclosed are an adhesive layer forming apparatus and a display device manufacturing system including the same. The adhesive layer forming apparatus includes a first support chuck configured to move a first panel along a panel movement path in a first direction, a second support chuck provided side by side with the first support chuck in a second direction orthogonal to the first direction and configured to move a second panel along a panel movement path, and a first gantry configured to move a first head, which faces the first support chuck and the second support chuck, in the second direction on the first support chuck and the second support chuck and forms an adhesive layer on any one of the first panel and the second panel by jetting.

6 Claims, 10 Drawing Sheets

(56) References Cited

U.S. PATENT DOCUMENTS

| | | | |
|---|---|---|---|
| 2016/0101613 A1* | 4/2016 | Shih | H01L 21/02096 |
| | | | 156/701 |
| 2019/0224954 A1* | 7/2019 | Jang | B32B 37/1284 |

* cited by examiner

ADHESIVE LAYER FORMING APPARATUS AND DISPLAY DEVICE MANUFACTURING SYSTEM INCLUDING THE SAME

CROSS-REFERENCE TO RELATED APPLICATION(S)

This application claims priority to and the benefit of Korean Patent Application No. 2021-0099456 under 35 U.S.C. § 119, filed on Jul. 28, 2021 in the Korean Intellectual Property Office (KIPO), the entire contents of which are incorporated herein by reference.

BACKGROUND

1. Technical Field

The invention relates to an adhesive layer forming apparatus and a display device manufacturing system including the same, and more particularly, to an adhesive layer forming apparatus and a display device manufacturing system including the same capable of manufacturing a display device.

2. Discussion of Related Art

With the development of display technology, various types of display devices are being developed. Depending on the light emission manner, there are display devices such as liquid crystal displays (LCDs), organic light-emitting diode (OLED) displays, plasma display panels (PDPs), micro LED displays, and the like.

A display device is formed of different functional panels, and the panels are bonded with adhesive layers interposed therebetween. Depending on the type of the adhesive layer, there are adhesive layers such as film-type adhesive layers (e.g., optically clear adhesives (OCAs)), and liquid-curable adhesive layers (e.g., optically clear resins (OCRs)) formed by applying and curing a liquid-type adhesive.

Numerous processes are performed in the manufacturing process of display devices, and the processes are sequentially performed according to a series of sequences. As a method of improving a yield of products in process equipment of the display devices, a method of configuring two or more process lines performing the same function, a method of providing integrated equipment in which pieces of equipment for a series of processes such as a preprocessing process and a main process are integrated, or the like is applied.

The conventional display device manufacturing system has problems in that different processes are individually performed, movement is required between process regions, and discontinuous processes cause a decrease in process efficiency.

In addition, the conventional display device manufacturing system includes an adhesive layer forming part including one head and one ultraviolet (UV) curing system to form an adhesive layer in a single process by jetting, and thus the conventional display device manufacturing system has problems in that an adhesive layer forming process and a UV curing process should be performed only in one adhesive layer forming part when forming an adhesive layer of a desired shape, and a process of forming adhesive layers for different panels is delayed by a waiting time, thereby lowering productivity and increasing manufacturing cost.

DOCUMENT OF RELATED ART

Patent Document (Patent Document 0001) Korean Patent Registration No. 10-1848039 (Published on Apr. 5, 2018)

SUMMARY OF THE INVENTION

The disclosure is directed to providing a display device manufacturing system with a high throughput in a series of processes in manufacturing a display device.

The disclosure is also directed to providing a display device manufacturing system with an improved degree of spatial intensity.

According to an aspect of the disclosure, an adhesive layer forming apparatus is provided.

The adhesive layer forming apparatus may include a first support chuck configured to move a first panel along a panel movement path in a first direction, a second support chuck provided side by side with the first support chuck in a second direction orthogonal to the first direction and configured to move a second panel along a panel movement path, and a first gantry configured to move a first head, which faces the first support chuck and the second support chuck, in the second direction on the first support chuck and the second support chuck and forms an adhesive layer on any one of the first panel and the second panel by jetting.

The adhesive layer forming apparatus may further include a second gantry provided side by side with the first gantry in the second direction and configured to move a second head, which faces the first support chuck and the second support chuck, in the second direction on the first support chuck and the second support chuck and forms an adhesive layer on any one of the first panel and the second panel by jetting.

The adhesive layer forming apparatus may further include a controller configured to sequentially control the first head and the second head to form the adhesive layer on the first panel.

The adhesive layer forming apparatus may further include a third gantry configured to move an ultraviolet (UV) curing system, which temporarily cures the adhesive layer on the first panel or the second panel, in any one direction of the first direction and the second direction.

The adhesive layer forming apparatus may further include a controller configured to control a movement speed of the first support chuck or the second support chuck for each position on the panel movement path.

The controller may drive and control the first support chuck independently of the second support chuck.

According to another aspect of the disclosure, there is provided a display device manufacturing system.

The display device manufacturing system may include a loading part in which a first panel or a second panel is loaded, an adhesive layer forming apparatus provided adjacent to the loading part and configured to form an adhesive layer on the first panel or the second panel, and a laminating part provided adjacent to the adhesive layer forming apparatus and configured to bond a panel to be adhered to any one of the first panel and the second panel, on which the adhesive layer is formed, wherein the adhesive layer forming apparatus may include the adhesive layer forming apparatus according to claim 1.

The display device manufacturing system may further include a first transfer robot configured to transfer the first panel or the second panel between the loading part and a preprocessing part, a second transfer robot moved along a first rail formed in a first direction and configured to transfer the first panel or the second panel between the preprocessing part and the first and second support chucks, and a third transfer robot moved along a second rail, which is spaced apart from the first rail in a second direction orthogonal to the first direction and formed in the second direction, and configured to transfer the first panel or the second panel between a measurement part and the first and second support chucks.

BRIEF DESCRIPTION OF THE DRAWINGS

The above and other objects, features and advantages of the disclosure will become more apparent to those of ordinary skill in the art by describing exemplary embodiments thereof in detail with reference to the accompanying drawings, in which:

FIG. 1 is a schematic view illustrating a display device manufacturing system according to an embodiment of the disclosure;

FIG. 4 is a perspective view illustrating each movable range of the adhesive layer forming apparatus of FIG. 1;

DETAILED DESCRIPTION OF EXEMPLARY EMBODIMENTS

Figure 2:
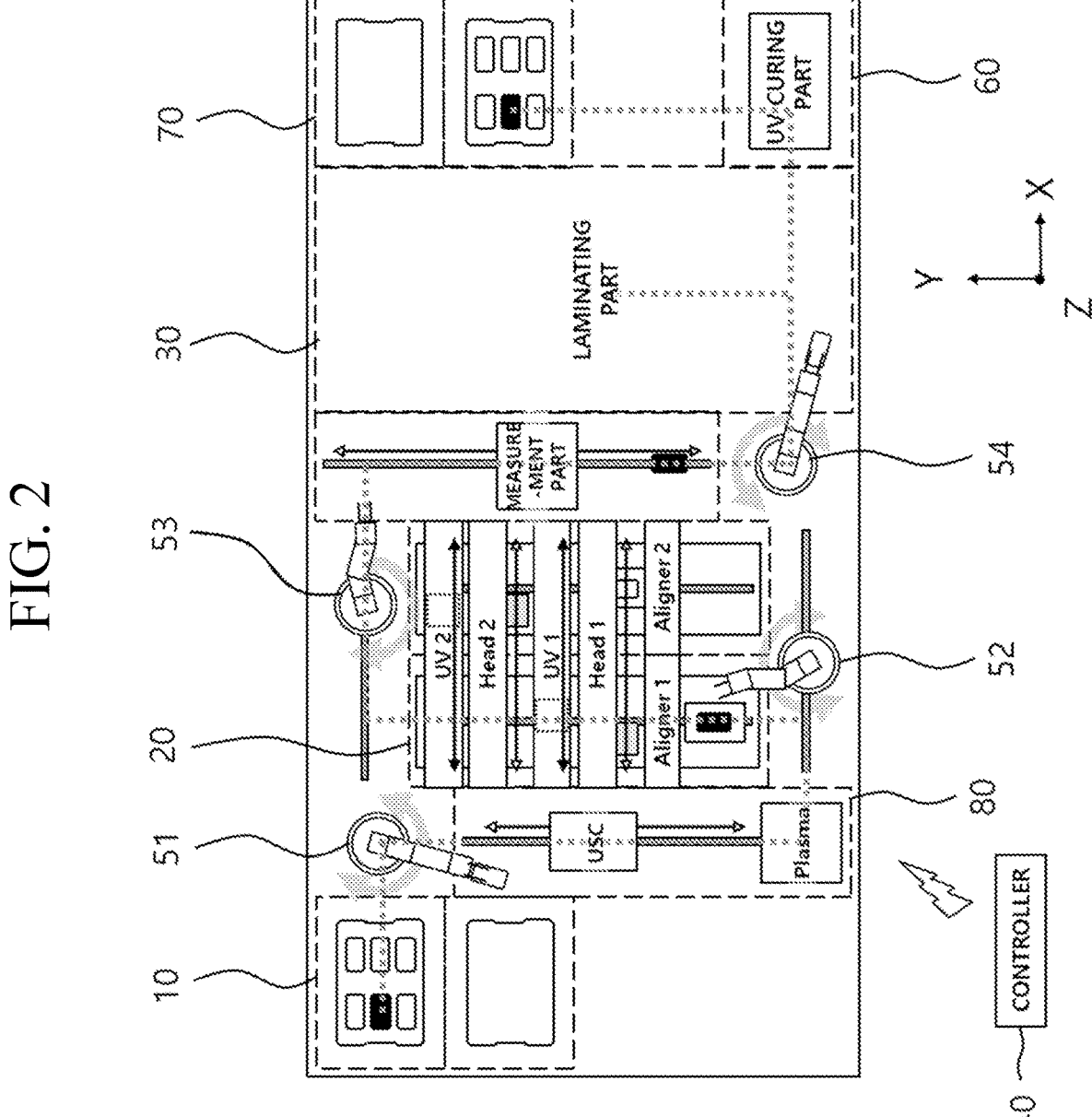
FIG. 2 is an operation flow diagram illustrating a movement path of a panel on the display device manufacturing system of FIG. 1.

Hereinafter, exemplary embodiments of the disclosure will be described in detail with reference to the accompanying drawings. However, the technological scope of the disclosure is not limited to the embodiments described herein, and may be implemented in a different form. The embodiments described herein are provided to thoroughly complete the disclosure and fully convey the concept of the disclosure to those skilled in the art.

In the specification, when an element is referred to as being formed on another element, the description includes the meaning of the first element being directly formed on the second element or the meaning of a third element being interposed between the two elements. In addition, in the drawings, the shapes and sizes of elements are exaggerated for effective description of technical content.

In addition, in various embodiments of the disclosure, although the terms "first," "second," "third," etc. are used herein to describe various elements, these elements should not be limited by these terms. These terms are only used to distinguish one element from another element. Therefore, an element which is referred to as a first element in any one embodiment may be referred to as a second element in another embodiment. Each embodiment described and illustrated herein also includes a complementary embodiment thereof. Further, in the specification, the term "and/or" is used in a sense that includes at least one of elements listed before and after.

In the specification, the singular forms "a" and "an" are intended to also include the plural forms as well, unless the context clearly indicates otherwise. Further, it should be understood that the terms "comprise," "comprising," "include," and/or "including," when used herein, specify the presence of stated features, integers, steps, elements, or combinations thereof, but do not preclude the presence or addition of one or more other features, integers, steps, elements, or combinations thereof. Further, in the specification, the term "connection" of a plurality of elements is used in a sense that includes both the case in which the elements are indirectly connected to each other and the case in which the elements are directly connected to each other.

In addition, in the following descriptions of the disclosure, when detailed descriptions of related known functions or configurations are deemed to unnecessarily obscure the gist of the disclosure, they will be omitted.

For convenience of description, a first direction is referred to as a Y axis of a Cartesian coordinate system, a second direction is referred to as an X of the Cartesian coordinate system, and a third direction is referred to as a Z axis of the Cartesian coordinate system. In this case, the first direction is orthogonal to the second direction and the third direction.

Figure 1:
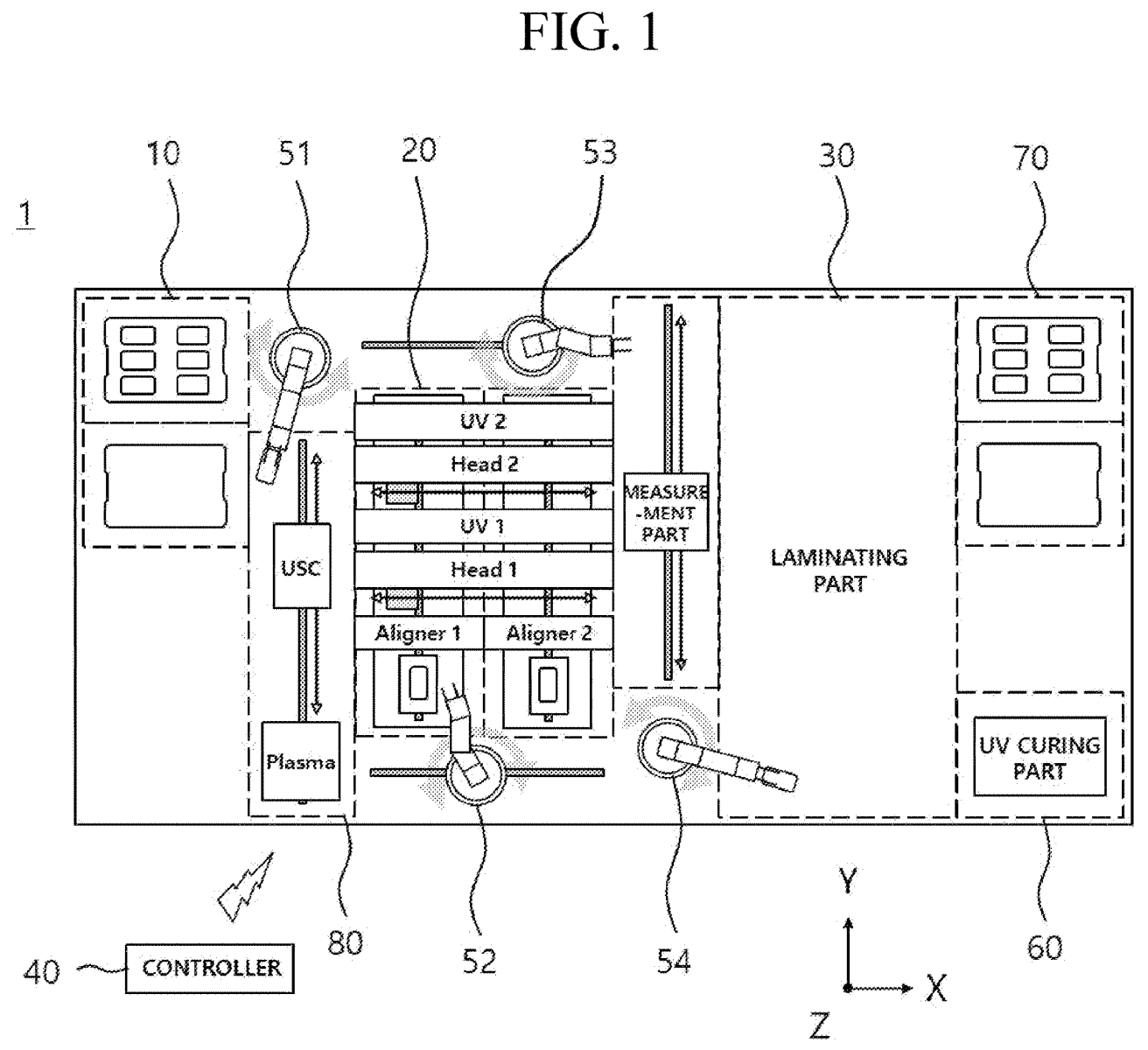
Figure 3:
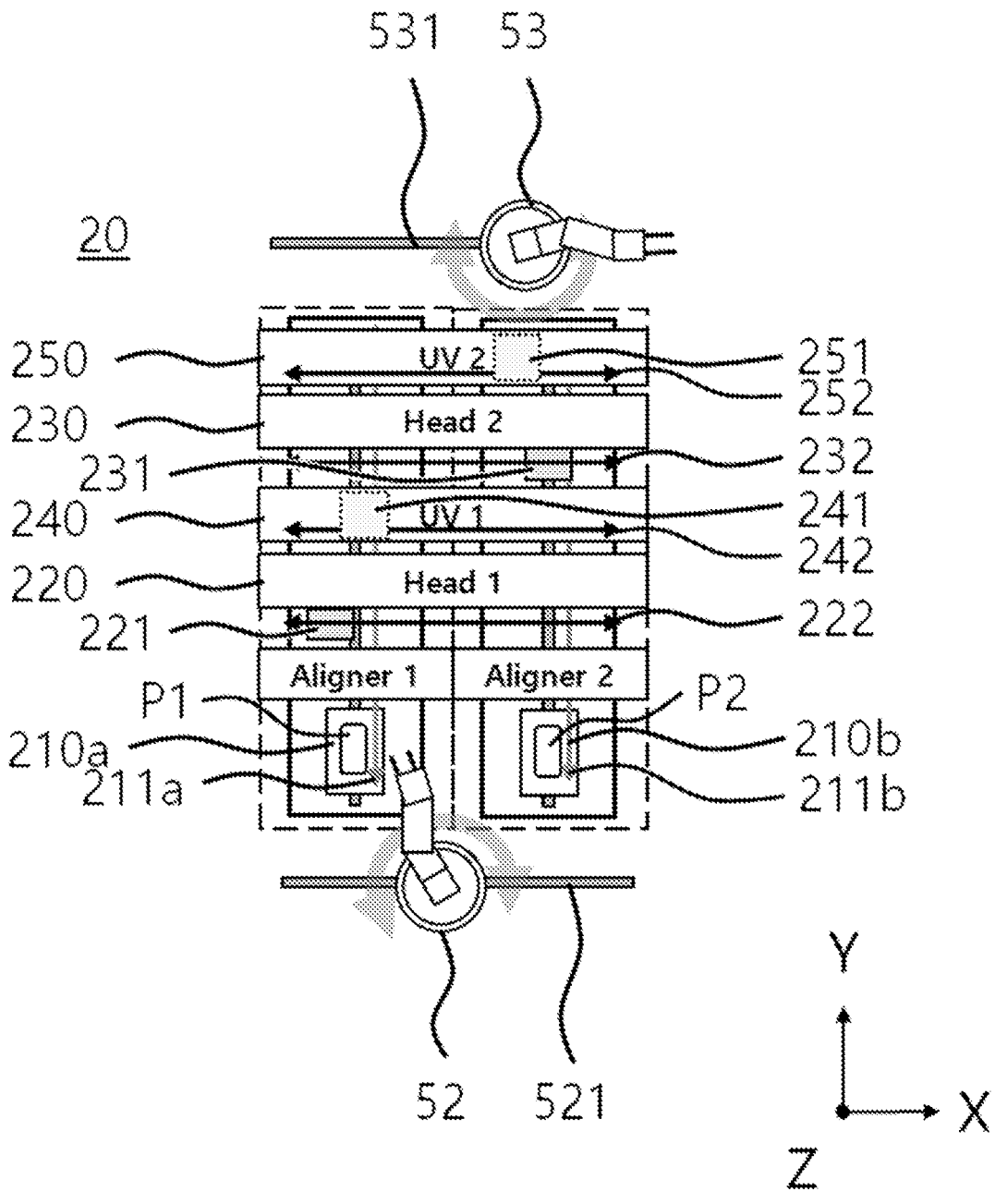
FIG. 3 is an enlarged view illustrating an adhesive layer forming apparatus of FIG. 2.
Figure 4:
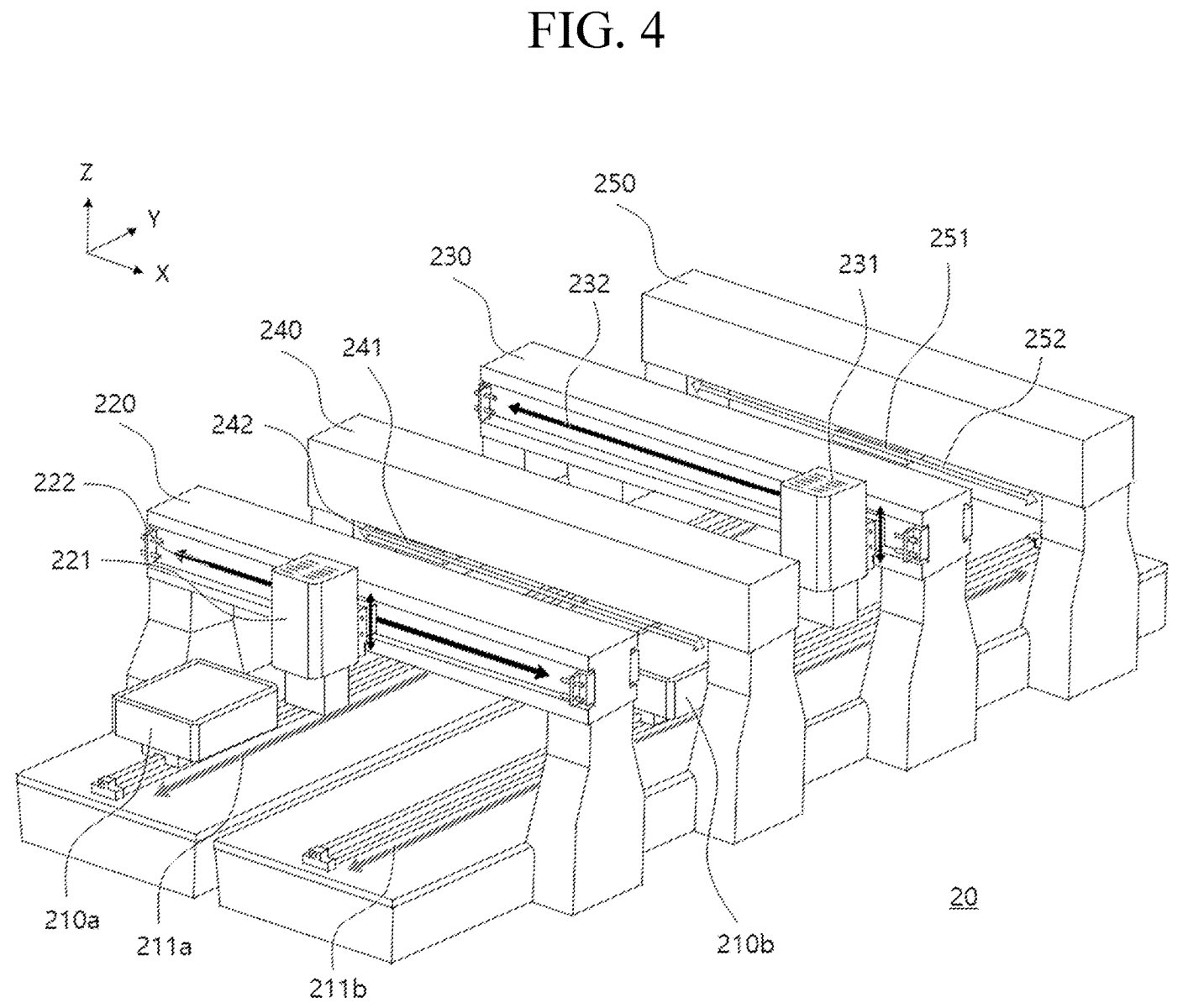
Figure 5:
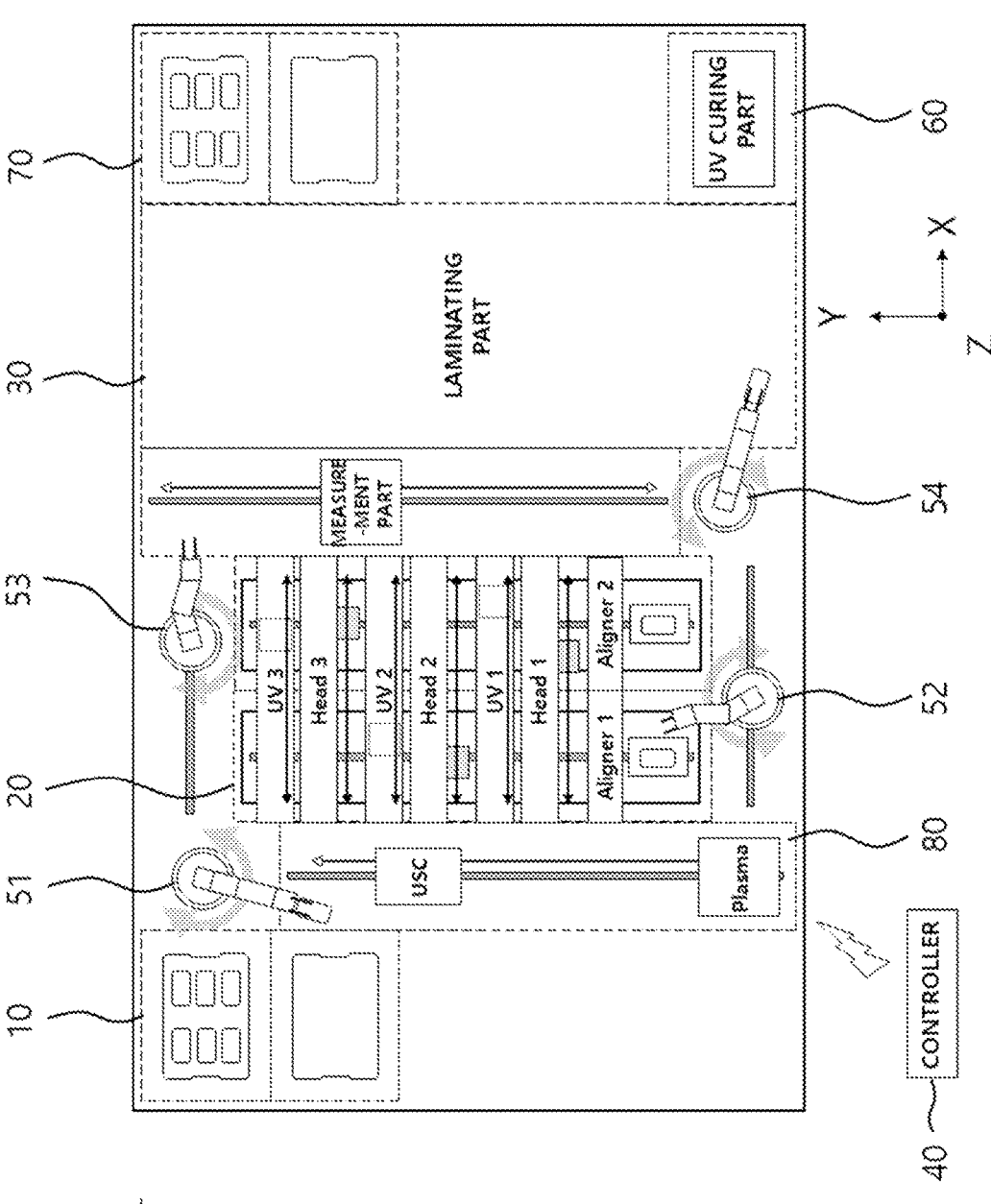
FIG. 5 is a schematic view illustrating a display device manufacturing system according to another embodiment of the disclosure.
Figure 6:
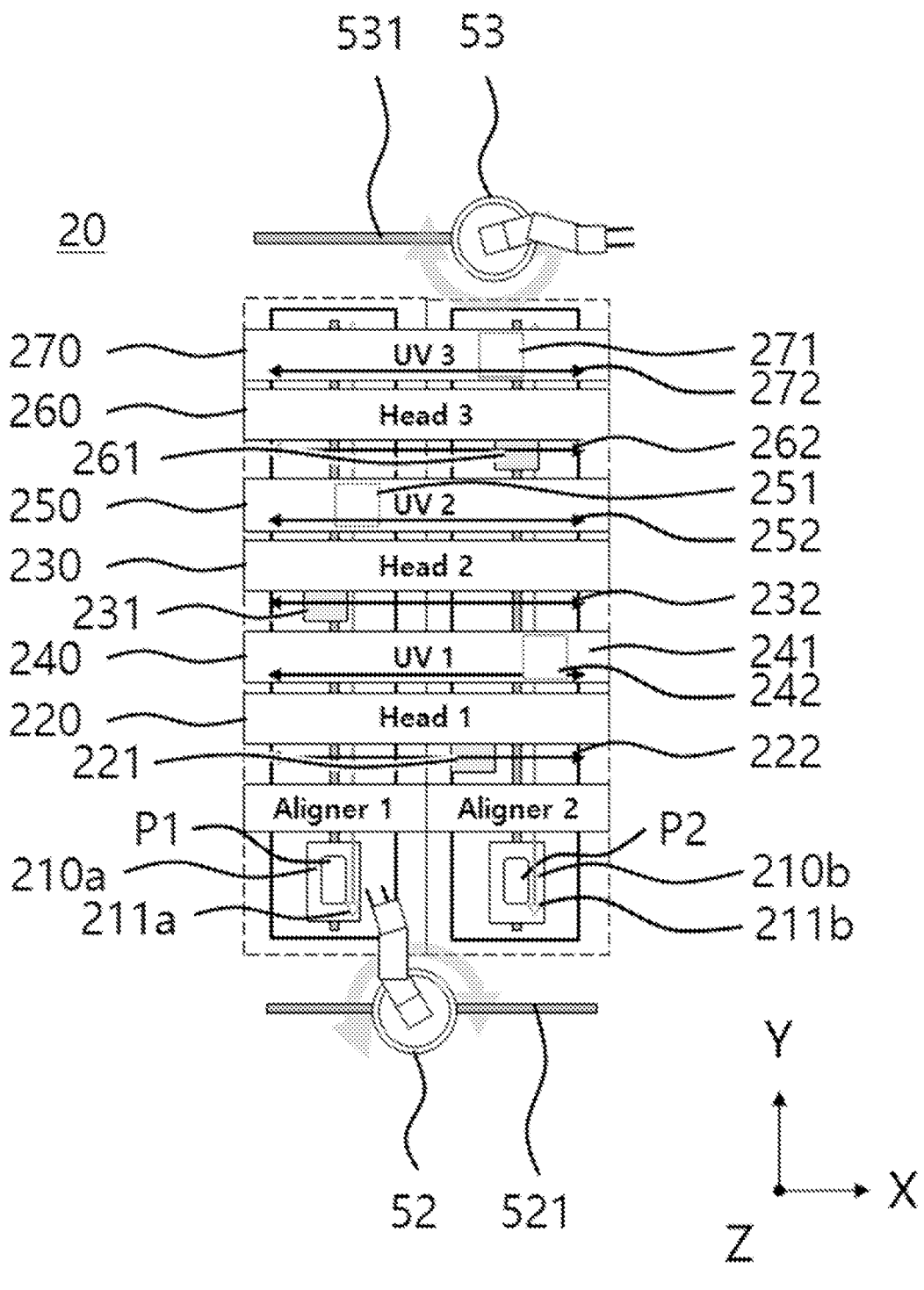
FIG. 6 is an enlarged view illustrating an adhesive layer forming apparatus of FIG. 5.
Figures 7A, 7B, 7C:
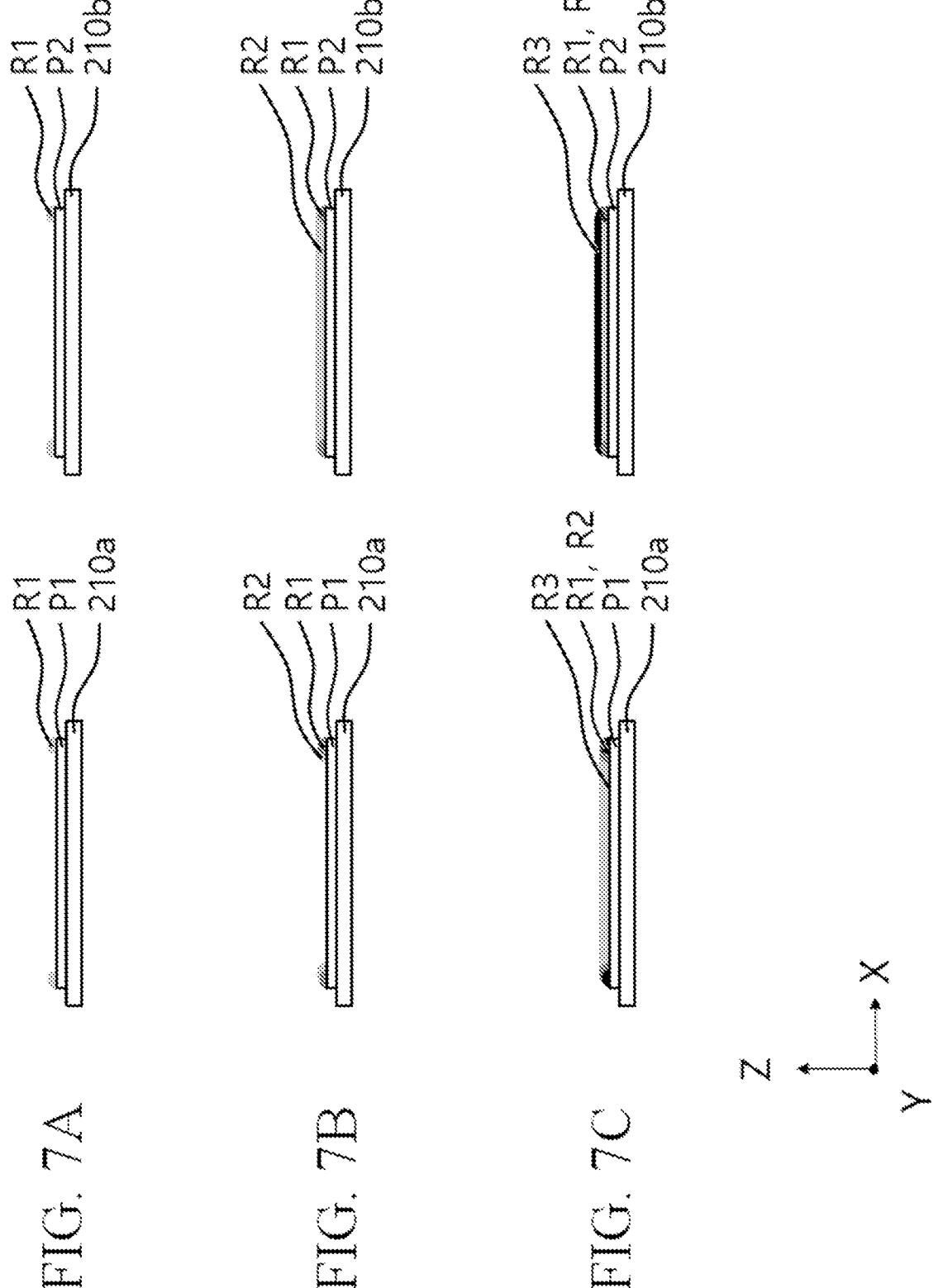
FIGS. 7A to 7C are schematic views illustrating adhesive layers, which are formed on a first support chuck and a second support chuck after a process of sequentially forming adhesive layers is performed by a first head, a second head, and a third head in FIG. 6.
Figure 8:
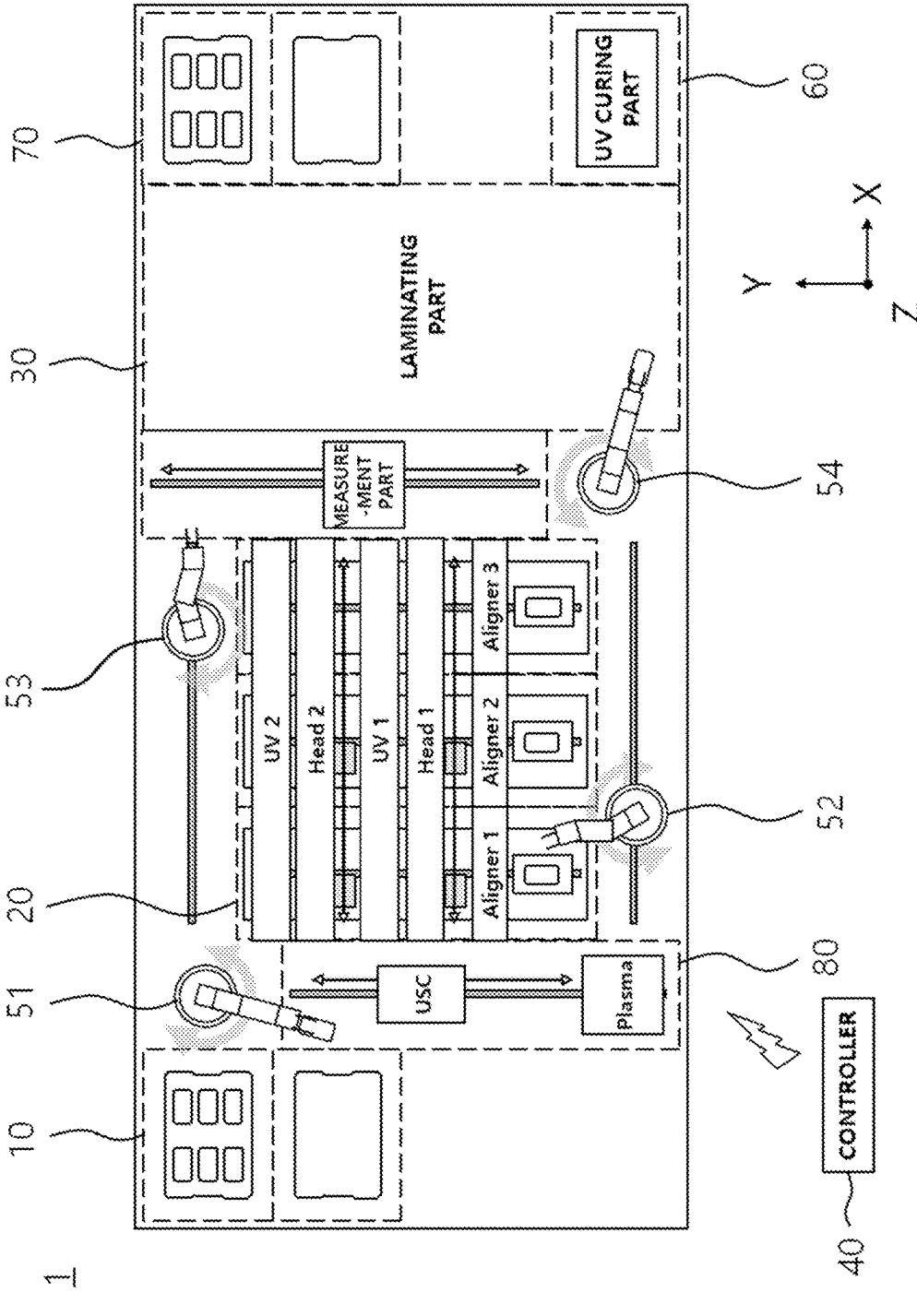
FIG. 8 is a schematic view illustrating a display device manufacturing system according to still another embodiment of the disclosure.
Figure 9:
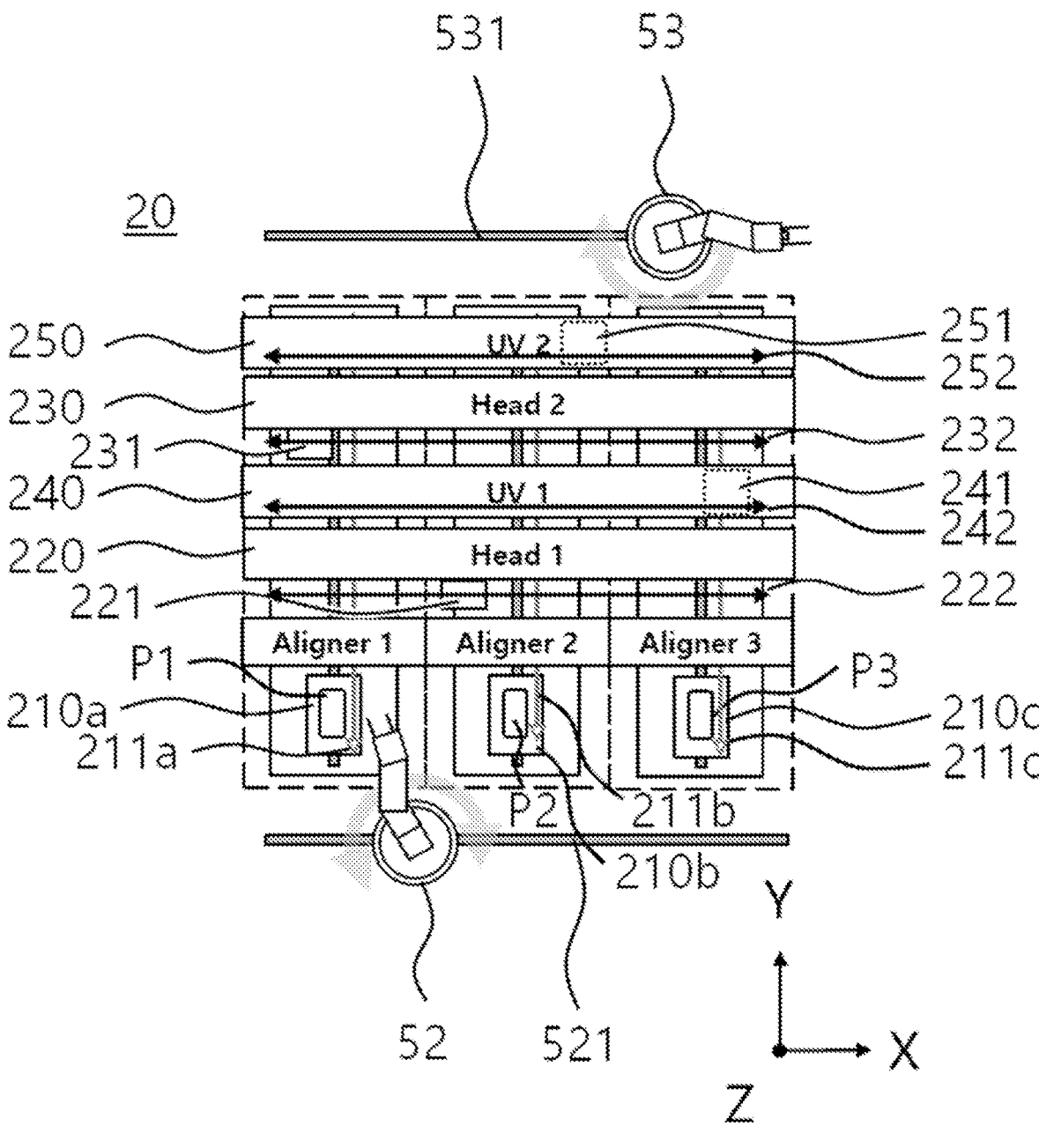
FIG. 9 is an enlarged view illustrating an adhesive layer forming apparatus of FIG. 8.
Figures 10A, 10B:
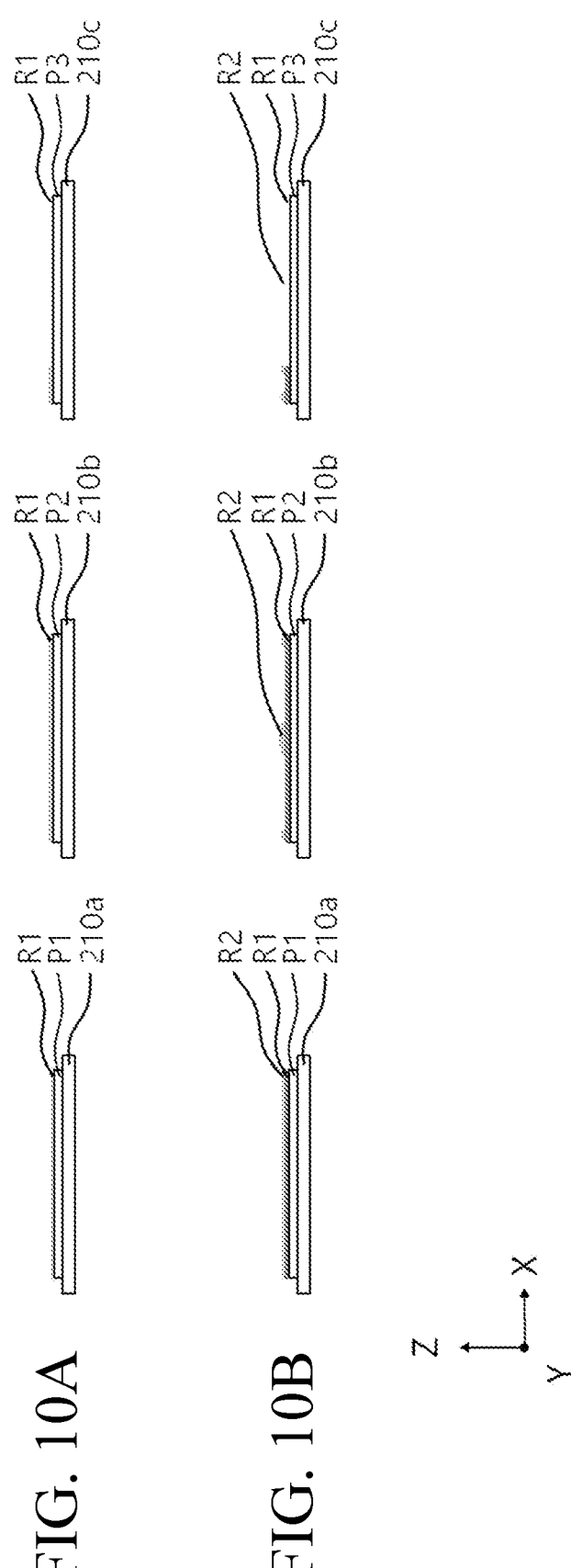
FIGS. 10A and 10B are schematic views illustrating adhesive layers, which are formed on a first support chuck, a second support chuck, and a third support chuck after a process of sequentially forming adhesive layers is performed by a first head and a second head in FIG. 9.

FIG. 1 is a schematic view illustrating a display device manufacturing system 1 according to an embodiment of the disclosure, FIG. 2 is an operation flow diagram illustrating a movement path of a panel on the display device manufacturing system 1 of FIG. 1, FIG. 3 is an enlarged view illustrating an adhesive layer forming apparatus 20 of FIG. 2, FIG. 4 is a perspective view illustrating each movable range of the adhesive layer forming apparatus 20 of FIG. 1, FIG. 5 is a schematic view illustrating a display device manufacturing system 1 according to another embodiment of the disclosure, FIG. 6 is an enlarged view illustrating an adhesive layer forming apparatus 20 of FIG. 5, FIGS. 7A to 7C are schematic views illustrating adhesive layers, which are formed on a first support chuck and a second support chuck after a process of sequentially forming adhesive layers is performed by a first head, a second head, and a third head in FIG. 6, FIG. 8 is a schematic view illustrating a display device manufacturing system 1 according to still another embodiment of the disclosure, FIG. 9 is an enlarged view illustrating an adhesive layer forming apparatus 20 of FIG. 8, and FIGS. 10A and 10B are schematic views illustrating adhesive layers, which are formed on a first support chuck, a second support chuck, and a third support chuck after a process of sequentially forming adhesive layers is performed by a first head and a second head in FIG. 9.

Hereinafter, a configuration and operation relationship of an adhesive layer forming apparatus 20 according to an embodiment of the disclosure will be described with reference to FIGS. 1 to 10.

Referring to FIGS. 1 to 10, the adhesive layer forming apparatus 20 according to the embodiment of the disclosure may sequentially form different adhesive layers R on a panel P1, P2, or P3.

Referring to FIGS. 1 to 6 and 8 again, the adhesive layer forming apparatus 20 according to the embodiment may include a first support chuck 210*a*, a second support chuck 210*b*, and a first gantry 220, and may further include a second gantry 230, a controller 40, and a third gantry 240.

Referring to FIGS. 3, 4, 6, and 7A to 7C again, the first support chuck 210*a* may support a first panel P1 and move the first panel P1 in one direction. That is, the first support chuck 210*a* may move the first panel P1 along a panel movement path.

A panel movement path 211*a*, 211*b*, or 211*c* is provided in a first direction, but the disclosure is not limited thereto. A rail that provides a path for the first support chuck 210*a* may be provided on the panel movement path.

Referring to FIGS. 3, 4, 6, and 7A to 7C again, the second support chuck 210*b* may support a second panel P2 and move the second panel P2 in one direction. The second support chuck 210*b* may be provided side by side with the first support chuck 210*a* in a second direction.

The first panel P1, the second panel P2, and a third panel P3 according to an embodiment of the disclosure may each be any one of a display panel, such as a liquid crystal display (LCD) panel, an organic light-emitting diode (OLED) panel, or a plasma display panel (PDP), a touch panel, and a window panel, or may each be a panel formed of a plurality of layers that are laminated and coupled. Further, the first panel P1, the second panel P2, and the third panel P3 may each include a flexible panel made of a flexible material that can be bent, folded, or rolled as well as a rigid panel.

Referring to FIGS. 3, 4, 6, and 9 again, the first gantry 220 may provide a path 222 along which a first head 221 is moved.

As illustrated in FIGS. 3, 4, and 6 again, the first gantry 220 according to an embodiment may be provided along the first support chuck 210*a* and the second support chuck 210*b*. The first gantry 220 may provide the position movement path 222 so that the first head 221 faces the first support chuck 210*a* and the second support chuck 210*b* in the second direction. The first gantry 220 may move the first head 221 in the second direction.

As illustrated in FIG. 9 again, the first gantry 220 according to still another embodiment may be provided along the first support chuck 210*a*, the second support chuck 210*b*, and a third support chuck 210*c*. The first gantry 220 may provide the position movement path 222 so that the first head 221 faces the first support chuck 210*a*, the second support chuck 210*b*, and the third support chuck 210*c* in the second direction. The first gantry 220 may move the first head 221 in the second direction.

As illustrated in FIGS. 3, 4, and 6 again, according to an embodiment, the first head 221 may be moved to face the first support chuck 210*a* or the second support chuck 210*b* while being supported by the first gantry 220 on the first support chuck 210*a* and the second support chuck 210*b*. The first head 221 may form an adhesive layer R on any one of the first panel P1 and the second panel P2 by jetting. The first head 221 may form different adhesive layers R on the first panel P1 and the second panel P2 by jetting.

As illustrated in FIG. 9 again, according to still another embodiment, the first head 221 may be moved to face any one of the first support chuck 210*a* to the third support chuck 210*c* while being supported by the first gantry 220 on the first support chuck 210*a*, the second support chuck 210*b*, and the third support chuck 210*c*. The first head 221 may form an adhesive layer R on any one of the first panel P1, the second panel P2, and the third panel P3 by jetting. The first head 221 may form different adhesive layers R on the first panel P1, the second panel P2, and the third panel P3 by jetting.

Referring to FIG. 4 again, the first head 221 may adjust a separation distance from the first support chuck 210*a* or the second support chuck 210*b* in a third direction.

An adhesive layer R may be formed by the first head 221 on the basis of a preset image.

Referring to FIGS. 3, 4, and 6 again, the second gantry 230 may provide a path 232 along which a second head 231 is moved.

As illustrated in FIGS. 3, 4, and 6 again, the second gantry 230 according to an embodiment may be provided along the first support chuck 210*a* and the second support chuck 210*b*. The second gantry 230 may provide the position movement path 232 so that the second head 231 faces the first support chuck 210*a* and the second support chuck 210*b* in the second direction. The second gantry 230 may move the second head 231 in the second direction.

As illustrated in FIG. 9 again, the second gantry 230 according to still another embodiment may be provided along the first support chuck 210*a*, the second support chuck 210*b*, and the third support chuck 210*c*. The second gantry 230 may provide the position movement path 232 so that the second head 231 faces the first support chuck 210*a*, the second support chuck 210*b*, and the third support chuck 210*c* in the second direction. The second gantry 230 may move the second head 231 in the second direction.

As illustrated in FIGS. 3, 4, and 6 again, according to an embodiment, the second head 231 may be moved to face the first support chuck 210*a* or the second support chuck 210*b* while being supported by the second gantry 230 on the first support chuck 210*a* and the second support chuck 210*b*. The second head 231 may form an adhesive layer R on any one of the first panel P1, the second panel P2, and the third panel P3 by jetting. The second head 231 may form different adhesive layers R on the first panel P1 and the second panel P2 by jetting. Further, the second head 231 may form an adhesive layer R different from that formed by the first head 221 on the first panel P1 by jetting.

As illustrated in FIG. 9 again, according to still another embodiment, the second head 231 may be moved to face any one of the first support chuck 210*a* to the third support chuck 210*c* while being supported by the second gantry 230 on the first support chuck 210*a*, the second support chuck 210*b*, and the third support chuck 210*c*. The second head 231 may form an adhesive layer R on any one of the first panel P1 and the second panel P2 by jetting. The second head 231 may form different adhesive layers R on the first panel P1, the second panel P2, and the third panel P3 by jetting.

Referring to FIG. 4 again, the second head 231 may adjust a separation distance from the first support chuck 210*a* or the second support chuck 210*b* in the third direction.

An adhesive layer R may be formed by the second head 231 on the basis of a preset image.

Referring to FIGS. 3, 4, and 6 again, the third gantry 240 may provide a path 242 along which a first ultraviolet (UV) curing system 241 is moved. The third gantry 240 may move the first UV curing system 241 in the first direction or the second direction.

The third gantry 240 according to an embodiment may provide a position movement path to the first UV curing system 241 in a direction parallel to the first support chuck 210*a* in the first direction. In this case, the third gantry 240 may be provided at a position different from that of the first gantry 220 or the second gantry 230 in the third direction. That is, the first UV curing system 241 may be disposed on the movement path on the third gantry 240 such that there is no physical interference with the first head 221 and the second head 231.

As illustrated in FIGS. 3, 4, and 6 again, the third gantry 240 according to another embodiment may be provided along the first support chuck 210*a* and the second support chuck 210*b* in the second direction. The third gantry 240 may provide the position movement path 242 to the first UV curing system 241 so as to be positioned on the first support chuck 210*a* and the second support chuck 210*b* in the second direction. The third gantry 240 may provide a position path so that the first UV curing system 241 faces the first support chuck 210*a* and the second support chuck 210*b* in the second direction. The third gantry 240 may move the first UV curing system 241 in the second direction.

As illustrated in FIG. 9 again, the third gantry 240 according to still another embodiment may be provided along the first support chuck 210*a*, the second support chuck 210*b*, and the third support chuck 210*c* in the second direction. The third gantry 240 may provide the position movement path 232 so that the first UV curing system 241 faces the first support chuck 210*a*, the second support chuck 210*b*, and the third support chuck 210*c* in the second direction. The third gantry 240 may move the first UV curing system 241 in the second direction.

The first UV curing system 241 may temporarily cure the adhesive layer R, which is formed on the panel P1 or P2 by jetting. The first UV curing system 241 may cure the adhesive layer R enough to suppress the fluidity of the adhesive layer R so that the adhesive layer R is maintained in the same shape and thickness as the preset image.

Referring to FIGS. 3, 4, and 6 again, a fourth gantry 250 may provide a path 252 along which a second UV curing system 251 is moved. The fourth gantry 250 may move the second UV curing system 251 in the first direction or the second direction.

The fourth gantry 250 according to an embodiment may provide a position movement path to the second UV curing system 251 in a direction parallel to the first support chuck 210*a* in the first direction. In this case, the fourth gantry 250 may be provided at a position different from that of the first gantry 220 or the second gantry 230 in the third direction. That is, the second UV curing system 251 may be disposed on the movement path on the fourth gantry 250 such that there is no physical interference with the first head 221 and the second head 231.

As illustrated in FIGS. 3, 4, and 6 again, the fourth gantry 250 according to another embodiment may be provided along the first support chuck 210*a* and the second support chuck 210*b* in the second direction. The fourth gantry 250 may provide the position movement path 252 to the second UV curing system 251 so as to be positioned on the first support chuck 210*a* and the second support chuck 210*b* in the second direction. The fourth gantry 250 may provide a position path so that the second UV curing system 251 faces the first support chuck 210*a* and the second support chuck 210*b* in the second direction. The fourth gantry 250 may move the second UV curing system 251 in the second direction.

As illustrated in FIG. 9 again, the fourth gantry 250 according to still another embodiment may be provided along the first support chuck 210*a*, the second support chuck 210*b*, and the third support chuck 210*c* in the second direction. The fourth gantry 250 may provide the position movement path 232 so that the second UV curing system 251 faces the first support chuck 210*a*, the second support chuck 210*b*, and the third support chuck 210*c* in the second direction. The fourth gantry 250 may move the second UV curing system 251 in the second direction.

The second UV curing system 251 may temporarily cure the adhesive layer R which is formed on the panel P1, P2, or P3 by jetting. The second UV curing system 251 may cure the adhesive layer R enough to suppress the fluidity of the adhesive layer R so that the adhesive layer R is maintained in the same shape and thickness as the preset image.

Referring to FIGS. 1, 2, 5, and 8 again, the controller 40 may sequentially control the first head 221 and the second head 231 to form the adhesive layer R on the first panel P1. That is, the controller 40 may drive the first head 221 and then arbitrarily control a start driving time of the second head 231.

Further, the controller 40 may control a movement speed of the first support chuck 210*a* or the second support chuck 210*b* for each position on the panel movement path. The controller 40 may arbitrarily control coating and curing times of different adhesive layers R formed on the first panel P1.

The controller 40 may drive and control the first support chuck 210*a* independently of the second support chuck 210*b*.

Referring to FIGS. 7A to 7C again, the controller 40 may form and convert a plurality of images to correspond to a three-dimensional shape for each position of the adhesive layer R. More specifically, the controller 40 may control the generation of a first image for forming a first adhesive layer R1 on the first panel P1 and then control the generation of a second image for forming a second adhesive layer R2 on the first panel P1. Subsequently, the controller 40 may control the generation of a third image for forming a third adhesive layer R3 on the first panel P1.

Hereinafter, a configuration and operation relationship of a display device manufacturing system 1 including the adhesive layer forming apparatus 20 according to an embodiment of the disclosure will be described with reference to FIGS. 1 to 8.

Referring to FIGS. 1 to 8, the display device manufacturing system 1 may include a loading part 10, the adhesive layer forming apparatus 20, and a laminating part 30, and may further include a first transfer robot 51, a second transfer robot 52, and a third transfer robot 53. In the display device manufacturing system 1 according to an embodiment, in the manufacturing process of e a multi-layered display device formed of a panel P1 or P2, a jetting process of forming the adhesive layer R on the panel P1 or P2 and a bonding process of bonding the panel P1 or P2 to a panel to be adhered may be consecutively performed by one display device manufacturing system 1. According to an embodiment, the display device manufacturing system 1 may laminate or apply the adhesive layer R to the panel P1 or P2 and bond the panel P1 to the panel to be adhered with the adhesive R therebetween.

Referring to FIGS. 1, 2, 5, and 8 again, the loading part 10 may be a region in which the first panel P1 or the second panel P2 is loaded. The loading part 10 may provide the panel P1 or P2 to the display device manufacturing system 1.

A first aligner may adjust a position of the panel P1 mounted on the first support chuck 210*a* along X-Y axes, and further adjust an angle by rotation to adjust the position of the panel P1 on the first support chuck 210*a*.

Preferably, the first aligner may be a two-point aligner or a three-point aligner, but the disclosure is not limited thereto.

A second aligner may adjust a position of the panel P2 mounted on the second support chuck 210*b* along the X-Y axes, and further adjust an angle by rotation to adjust the position of the panel P2 on the second support chuck 210*b*.

Preferably, the second aligner may be a two-point aligner or a three-point aligner, but the disclosure is not limited thereto.

As illustrated in FIGS. 5 and 6 again, according to an embodiment, the adhesive layer forming apparatus 20 may further include a fifth gantry 260 including a third head 261, and a sixth gantry 270 including a third UV curing system 271 depending on the shape of the adhesive layer R to be laminated on the panel P1 or P2.

As illustrated in FIGS. 5 and 6 again, according to an embodiment, the fifth gantry 260 may provide a path 262 along which the third head 261 is moved.

As illustrated in FIGS. 5 and 6 again, the fifth gantry 260 according to an embodiment may be provided along the first support chuck 210*a* and the second support chuck 210*b*. The fifth gantry 260 may provide the position movement path 262 so that the third head 261 faces the first support chuck 210*a* and the second support chuck 210*b* in the second direction. The fifth gantry 260 may move the third head 261 in the second direction.

As illustrated in FIGS. 5 and 6 again, according to an embodiment, the third head 261 may be moved to face the first support chuck 210*a* or the second support chuck 210*b* while being supported by the fifth gantry 260 on the first support chuck 210*a* and the second support chuck 210*b*. The third head 261 may form an adhesive layer R on any one of the first panel P1 and the second panel P2 by jetting. The third head 261 may form different adhesive layers R on the first panel P1 and the second panel P2 by jetting.

The adhesive layer R may be formed by the third head 261 on the basis of a preset image.

As illustrated in FIGS. 5 and 6 again, according to an embodiment, the sixth gantry 270 may provide a path 272 along which the third UV curing system 271 is moved. The sixth gantry 270 may move the third UV curing system 271 in the first direction or the second direction.

The sixth gantry 270 according to an embodiment may provide a position movement path to the third UV curing system 271 in a direction parallel to the first support chuck 210*a* in the first direction. In this case, the sixth gantry 270 may be provided at a position different from that of the first gantry 220 or the second gantry 230 in the third direction. That is, the third UV curing system 271 may be disposed on a movement path on the sixth gantry 270 such that there is no physical interference with the first head 221, the second head 231, and the third head 261.

As illustrated in FIGS. 3, 4, and 6 again, the sixth gantry 270 according to another embodiment may be provided along the first support chuck 210*a* and the second support chuck 210*b* in the second direction. The sixth gantry 270 may provide a position movement path 272 to the third UV curing system 271 so as to be positioned on the first support chuck 210*a* and the second support chuck 210*b* in the second direction. The sixth gantry 270 may provide a position path so that the third UV curing system 271 faces the first support chuck 210*a* and the second support chuck 210*b* in the second direction. The sixth gantry 270 may move the third UV curing system 271 in the second direction.

As illustrated in FIG. 9 again, the sixth gantry 270 according to still another embodiment may be provided along the first support chuck 210*a*, the second support chuck 210*b*, and the third support chuck 210*c* in the second direction. The sixth gantry 270 may provide the position movement path 272 so that the third UV curing system 271 faces the first support chuck 210*a*, the second support chuck 210*b*, and the third support chuck 210*c* in the second direction. The sixth gantry 270 may move the third UV curing system 271 in the second direction.

Referring to FIGS. 8 to 10B again, the adhesive layer forming apparatus 20 may further include the third support chuck 210*c* depending on shapes of the adhesive layers R to be laminated on the panels P1 to P3.

The third support chuck 210*c* may be provided adjacent to the second support chuck 210*b*.

Referring to FIGS. 8 to 10B again, the third support chuck 210*c* may support the third panel P3 and move the third panel P3 in one direction. That is, the third support chuck 210*c* may move the third panel P3 along a panel movement path.

A panel movement path 211*a*, 211*b*, or 211*c* is provided in the first direction, but the disclosure is not limited thereto. A rail that provides a path for the third support chuck 210*c* may be provided on the panel movement path.

The adhesive layer forming apparatus 20 according to an embodiment of the disclosure may include a plurality of support chucks or a plurality of heads, and a UV curing system depending on the purpose of use, and the embodiment of the disclosure shows an example thereof, but is not limited thereto.

Referring to FIGS. 1, 2, 5, and 8 again, the laminating part 30 may be provided adjacent to the adhesive layer forming apparatus 20. The laminating part 30 may bond the panel to be adhered to the panel P1 or P2 on which the adhesive layer R is formed.

Referring to FIGS. 1, 2, and 6 again, a UV curing part 60 may completely cure the adhesive layers R1 and/or R2 in a temporary curing state. The UV curing part 60 may completely cure the adhesive layers R1, R2, and/or R3 interposed between the panel P1 and the panel to be adhered.

The UV curing part 60 may be configured in a UV curing N-stage buffer type or an in-line type. When the UV curing part 60 according to an embodiment is configured in an in-line type, the UV curing part 60 may be driven while spaced a predetermined pitch from a conveyor.

Referring to FIGS. 1, 2, and 6 again, an unloading part 70 may be a region from which a panel assembly PA is unloaded. The unloading part 70 may unload the panel assembly PA from the display device manufacturing system 1.

Referring to FIGS. 1, 2, and 6 again, a preprocessing part 80 may be any one of a vacuum chuck and an electrostatic chuck, or may be a chuck having both functions.

The preprocessing part 80 may determine a movement stroke on the basis of a process arrangement layout. The preprocessing part 80 may be driven by a linear motion (LM) part such as an LM guide or a ball screw.

The preprocessing part 80 may include an ultrasonic cleaning part, a protective film delamination part, and a plasma processing part.

The ultrasonic cleaning part may perform dry cleaning by applying ultrasonic waves to the panel P1 or P2 to which the protective film is attached. The ultrasonic cleaning part may remove foreign substances adsorbed on the panel P1 or P2 to which the protective film is attached.

The protective film delamination part may use the first transfer robot 51 to delaminate the protective film from the panel P1 or P2.

The plasma processing part may modify a surface of the panel P1 or P2. A contact angle may be improved by the plasma processing part, and thus adhesion ability of the panel P1 or P2 to the adhesive layer R can be improved.

Referring to FIGS. 1, 2, 5, and 6 again, the first to fourth transfer robots 51 to 54 may be spaced apart from each other on a series of process regions of the display device manufacturing system 1, and may each individually move the panel P1 or P2 between different process regions.

The first transfer robot 51 may transfer the first panel or the second panel between the loading part 10 and the preprocessing part 80. Further, the first transfer robot 51 may delaminate the protective film attached to the panel P1 or P2.

The first transfer robot 51 may be segmented into multiple joints. The first transfer robot 51 may include a robot hand in which a transfer function and a protective film delamination function may be implemented complexly. In order to implement the transfer function, the first transfer robot 51 may include a vacuum suction pad for adsorbing one surface of the panel P1 or P2, and a gripper capable of supporting the panel P1 or P2 in two directions.

The second transfer robot 52 may be moved along a first rail 521 formed in the first direction. The panel P1 or P2 may be transferred to the preprocessing part and the first or second support chuck.

The second transfer robot 52 may be segmented into multiple joints. The second transfer robot 52 may include a robot hand capable of transferring the panel P1. In order to implement the transfer function, the second transfer robot 52 may include a vacuum suction pad for adsorbing one surface of the panel P1 or P2, and a gripper capable of supporting the panel P1 or P2 in two directions.

The third transfer robot 53 may be moved along a second rail 531 formed in the first direction. The second rail 531 may be provided apart from the first rail 521. The second rail 531 may transfer the panel P1 or P2 between the first and second support chuck 210a and 210b and a measurement part.

The third transfer robot 53 may be segmented into multiple joints. The third transfer robot 53 may include a robot hand capable of transferring the panel P1. In order to implement the transfer function, the third transfer robot 53 may include a vacuum suction pad for adsorbing one surface of the panel P1 or P2, and a gripper capable of supporting the panel P1 or P2 in two directions.

The plurality of panels P1 and P2 may be simultaneously positioned in an arbitrary region within the display device manufacturing system 1 including the adhesive layer forming apparatus 20 in addition to the first support chuck 210a or the second support chuck 210b, and thus an adhesive layer forming process and a bonding process may be performed simultaneously.

According to an embodiment of the disclosure, different panels are mounted on a first support chuck and a second support chuck, a first gantry moves a first head so that the first head faces the first support chuck or the second support chuck, and it is possible to implement different adhesive layer forming processes, and thus a degree of spatial intensity can be improved and manufacturing efficiency can be maximized.

According to an embodiment of the disclosure, by moving a second head on a second gantry so that the second head capable of performing an adhesive layer forming process different from a first head is provided side by side with the first head, an adhesive layer can be formed without positional movement of a panel on the first support chuck or the second support chuck during a series of adhesive layer forming processes, and thus an additional alignment operation according to the positional movement is not required so that the performance of adhesive layer formation can be improved.

According to another embodiment of the disclosure, when an adhesive layer forming process is performed multiple times, a controller can arbitrarily control a time interval between an $N^{th}$ adhesive layer forming process and an $(N+1)^{th}$ adhesive layer forming process, and thus an adhesive layer having a desired shape can be formed.

According to still another embodiment of the disclosure, a controller can individually drive and control a first support chuck and a second support chuck, and thus productivity per spatial area can be increased.

According to yet another embodiment of the disclosure, a first transfer robot, a second transfer robot, and a third transfer robot, which have a wide movable range, can move each panel between different regions in the manufacturing process flow, and thus it is possible to increase the manufacturing quantity per area while occupying a small process site.

According to yet another embodiment of the disclosure, a loading part, a first support chuck, a second support chuck, and a laminating part are disposed adjacent to each other in different regions, and a panel can be transferred using first to third transfer robots in succession, and thus mass production performance can be improved.

While the disclosure has been described in detail with reference to exemplary embodiments, the scope of the disclosure is not limited to specific embodiments, and should be interpreted by the appended claims. Further, it should be understood by those skilled in the art that various changes and modifications may be made without departing from the scope of the disclosure.

What is claimed is:

1. An adhesive layer forming apparatus comprising:
a first support chuck configured to move a first panel along a panel movement path in a first direction;
a second support chuck provided side by side with the first support chuck in a second direction orthogonal to the first direction and configured to move a second panel along a panel movement path;
a first gantry configured to move a first head, which faces the first support chuck and the second support chuck, in the second direction on the first support chuck and the second support chuck and forms an adhesive layer on any one of the first panel and the second panel by jetting; and
a controller configured to control a movement speed of the first support chuck or the second support chuck for each position on the panel movement path, wherein the controller drives and controls the first support chuck independently of the second support chuck and is configured to arbitrarily control coating and curing times of different adhesive layers formed on the first panel.

2. The adhesive layer forming apparatus of claim 1, further comprising a second gantry provided side by side with the first gantry in the second direction and configured to move a second head, which faces the first support chuck and the second support chuck, in the second direction on the first support chuck and the second support chuck and forms an adhesive layer on any one of the first panel and the second panel by jetting.

3. The adhesive layer forming apparatus of claim 2, further comprising a controller configured to sequentially control the first head and the second head to form the adhesive layer on the first panel.

4. The adhesive layer forming apparatus of claim 1, further comprising a third gantry configured to move an ultraviolet (UV) curing system, which temporarily cures the adhesive layer on the first panel or the second panel, in any one direction of the first direction and the second direction.

5. A display device manufacturing system comprising:

a loading part in which a first panel or a second panel is loaded;

an adhesive layer forming apparatus provided adjacent to the loading part and configured to form an adhesive layer on the first panel or the second panel; and a laminating part provided adjacent to the adhesive layer forming apparatus and configured to bond a panel to be adhered to any one of the first panel and the second panel, on which the adhesive layer is formed, wherein the adhesive layer forming apparatus includes the adhesive layer forming apparatus according to claim 1.

6. The display device manufacturing system of claim 5, further comprising:

a first transfer robot configured to transfer the first panel or the second panel between the loading part and a preprocessing part;

a second transfer robot moved along a first rail formed in a first direction and configured to transfer the first panel or the second panel between the preprocessing part and the first and second support chucks; and a third transfer robot moved along a second rail, which is spaced apart from the first rail in a second direction orthogonal to the first direction and formed in the second direction, and configured to transfer the first panel or the second panel between a measurement part and the first and second support chucks.

* * * * *